March 29, 1955  F. J. KIRKMAN  2,705,253
PRIMARY BATTERY
Filed Oct. 1, 1953
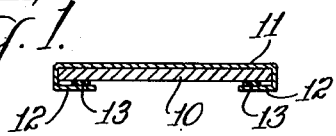
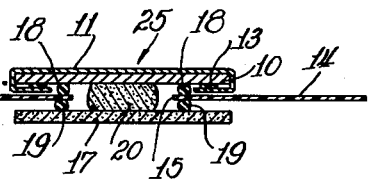
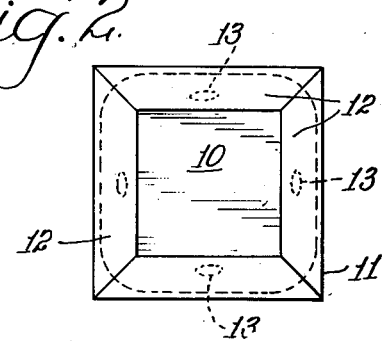
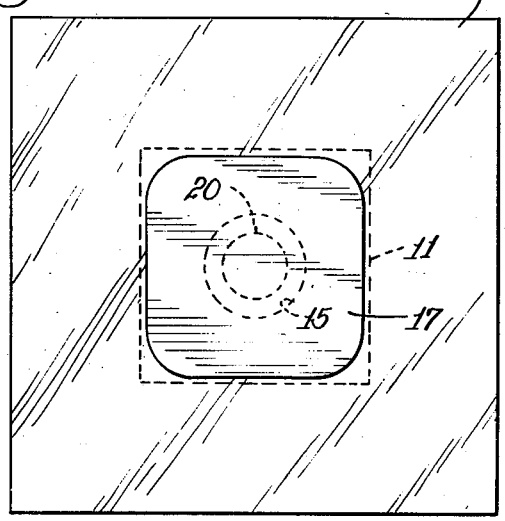
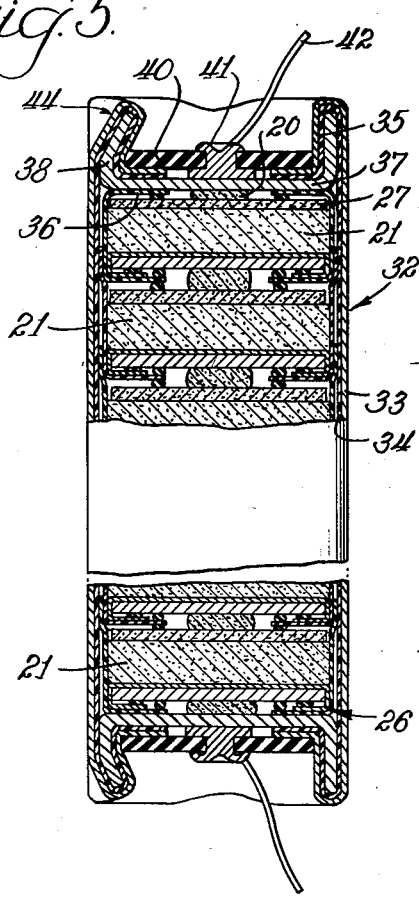
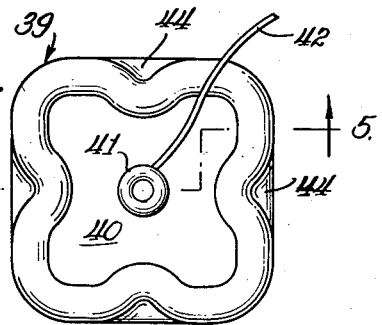
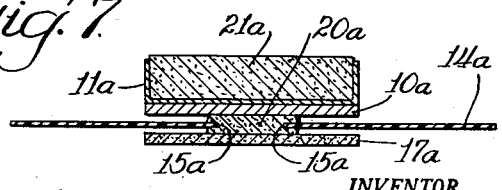
INVENTOR.
Fredrick J. Kirkman
BY
Jones, Tesek & Darbo
Atty's

United States Patent Office 2,705,253
Patented Mar. 29, 1955

2,705,253
PRIMARY BATTERY

Fredrick J. Kirkman, Freeport, Ill., assignor to Burgess Battery Company, Freeport, Ill., a corporation of Delaware Application October 1, 1953, Serial No. 383,444

8 Claims. (Cl. 136—111)

This invention relates to primary batteries and particularly to dry cell batteries having a plurality of flat cell elements stacked in juxtaposed laminar relation. More particularly, it relates to batteries of the character described having an improved stack arrangement of flat cell elements. Specifically, the invention relates to primary batteries which are made up of flat composite electrode units and masses of depolarizer mix stacked together in an alternating arrangement. The construction of the invention is particularly adapted for use in batteries of small size such as are used in portable electronic equipment. The invention also relates to the composite electrode unit.

In small batteries of the character described, there are serious problems of isolating the electrolyte of the individual cells and preventing leakage between cells, preventing particles of depolarizer mix from coming in contact with the negative electrode, providing a maximum amount of space for the active elements, effectively sealing and preventing drying out of the cells, and at the same time providing a construction which is simple and economical from the standpoints of structure and method of manufacture and which lends itself to rapid machine production.

The object of the invention is to provide a battery having an improved cell stack arrangement and cooperating casing in which the problems mentions hereinbefore are satisfactorily met.

Specifically, it is an object of the invention to provide an improved flat cell battery construction having a stack arrangement of cell elements in which the electrolyte is effectively isolated within the individual cells, the depolarizing mix is isolated from the negative electrode, and the cells are effectively sealed so that drying out is prevented.

Another object is to provide a battery construction of the character described in which a maximum amount of space is provided for active materials.

A further object is to provide a battery of the character described which is simple and economical with respect to materials, structure and method of fabrication, and which lends itself to rapid machine production.

A further object is to provide a composite electrode unit of flat cell elements which can be made in any desired size and a plurality of which can be combined with masses of depolarizer mix to form a multiple cell battery of the desired voltage and capacity.

Further objects will be apparent from the following description, which is to be taken in conjunction with the accompanying drawings, in which:

Fig. 1 is a transverse sectional view of a negative electrode with an associated bibulous separator;

Fig. 2 is a plan view of the negative electrode and associated separator shown in Fig. 1;

Fig. 3 is a transverse sectional view of a composite electrode unit in accordance with the invention, employing the negative electrode and bibulous separator shown in Figs. 1 and 2;

Fig. 4 is a plan view of the composite electrode unit of Fig. 3;

Fig. 5 is a longitudinal view, partly in section, of a battery employing the cell stack arrangement in accordance with the invention, taken along line 5—5 of Fig. 6;

Fig. 6 is a plan view of the battery of Fig. 5, and

Fig. 7 is a sectional view, similar to Fig. 3, of a different embodiment of a composite electrode unit.

In accordance with the present invention, the cell stack is comprised of a plurality of preformed composite electrode units and masses of depolarizer mix stacked in an alternating laminar arrangement. Individually complete cells are not formed prior to the assembly of the battery.

As shown in Figs. 1 and 2, negative electrode or anode 10 is a thin, flat, plate-form element substantially square in shape with rounded corners, and is composed of a suitable negative metal such as zinc. The shape factor is not important in the present invention, and any suitable shape may be used such as oval, round, rectangular, etc.

Parallel to and covering one broad surface of negative electrode 10 is a non-conductive, sheet-form bibulous separator 11 composed of a suitable material such as blotting paper. Separator 11 is square in shape, having a substantially greater area than negative electrode 10. It covers the front surface of said electrode and the peripheral margins 12 thereof are folded around the edges of said electrode and against the marginal portion of the rear surface of said electrode, leaving exposed a substantial mid-portion of said rear surface. The marginal folds 12 of separator 11 are adhesively secured to electrode 10 over the area of said folds or at a plurality of local areas 13.

Adjacent to the rear surface of negative electrode 10 is a thin, impervious, flexible sheet or film 14 of an electrolyte-resistant, dielectric, thermoplastic material such as polyethylene, the co-polymer of vinyl chloride and vinyl acetate or the rubber hydrochloride product known as "Pliofilm." Sheet 14 is square in shape and has an area substantially greater than that of negative electrode 10 and has an aperture 15 located at the mid-portion thereof. Sheet 14 has the known property of adhering or welding to itself under the application of heat. Negative electrode 10 and sheet 14 are so arranged relative to each other that the exposed portion of said electrode overlies aperture 15 and a relatively wide continuous peripheral margin of sheet 14 extends beyond the edges of the electrode.

Parallel and adjacent the opposite broad surface of sheet 14 is a thin, plate-form positive electrode 17, composed in the known manner of particles of conductive carbon or graphite, in a suitable binder such as polyisobutylene. Other forms of carbonaceous electrode, such as a flexible fabric or cloth impregnated with a conductive carbonaceous composition, may be used. It has the same lateral size and shape as negative electrode 10 and is positioned so as to overlie aperture 15 and be in substantial alignment with negative electrode 10.

Encircling aperture 15 and positioned between the negative electrode 10 and the dielectric sheet 14 is a ring 18 of electrolyte-resistant, non-conductive, adhesive-plastic material such as tar, pitch, asphalt or the like. Ring 18 adhesively joins the negative electrode 10 to the dielectric sheet 14 and acts as a sealing member, the latter function being described more fully hereinafter.

Also encircling aperture 15 and positioned between positive electrode 17 and dielectric sheet 14 is a second adhesive-plastic non-conductive ring 19, similar in composition to ring 18, adhesively joining said electrode 17 to said sheet 14. In practice rings 18 and 19 are applied to electrodes 10 and 17 respectively prior to the assembly with sheet 14.

Positioned within aperture 15 and between electrodes 10 and 17 is an adhesive-plastic, electrolyte-resistant, conductive mass 20, which may be composed of finely divided silver particles in a wax-like binder-lubricant such as microcrystalline wax, paraffin wax or the like, as disclosed in copending application of Sam Kurlandsky Serial No. 161,892, filed May 13, 1950, now Patent No. 2,666,803. Conductive mass 20 adheres to the exposed surfaces of electrodes 10 and 17 thereby joining them together mechanically and electrically through aperture 15. In the preferred practice, a portion of conductive mass 20 is applied in the heated condition to the negative electrode 10 prior to the assembly of the elements, when the mass is soft and plastic and makes intimate contact with the electrode. Another portion is applied similarly to the positive electrode 17, and when the two electrodes are assembled they are then pressed together whereby the portions of mass 20 merge together and form a highly conductive intercell connection which is rugged and water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

Example 1

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

Example 2

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

Example 3

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

Example 4

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

Example 5

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

Example 6

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

Example 7

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

The cell structure of the invention also permits substantial leeway in the amount of mix, whereby control need not be exact and the amount may be varied to adapt the cell for a particular type of service. This flexibility is provided by employing a relatively wet mix which is soft, plastic and easily molded under pressure, and providing space laterally of the edges of the mix slab into which the mix can spread under the pressure of compacting the cells and battery. In the battery of the invention, when the stack of cells is compressed longitudinally, the mix cakes spread laterally until they come in contact with the cell walls formed by the sheets 14, and the overall length of the battery is determined by the aggregate amount of mix present in the entire battery.

In the battery of the present invention, the pressure created in compacting the stack of cells is distributed over a retaining means of relatively wide area and high strength since in each cell the envelope wall formed by the sheets 14 extends laterally outward to the wall of casing 32 whereby substantially the entire area and strength of the casing serves to fortify and strengthen the envelopes for the individual cells. Cells usually undergo expansion in use with resulting increase in internal pressure, and the retaining means of wide area and high strength is useful in resisting the forces created by such pressure. Such strengthened envelopes also resist the leakage of electrolyte from the individual cells.

The cells and battery of the present invention are also economical of space since the only separations between cells are the very thin sheets or films 14. As a result, a maximum amount of space within the casing is occupied by the active elements.

The battery is simple and economical from the standpoint of both structure and manufacture. All of the elements including the mix slab 21 are initially in the form of sheets or strips which are blanked out to form the elements. The mix is initially in the form of a thick sheet of large dimensions which is cut transversely into the slabs 21. A construction of the character described lends itself to rapid machine production, and the result is a battery of structural simplicity. Also, close control is easily obtained, and as one attribute of this, the openings 15 in the impervious sheets 14 are easily caused to register with an exposed area of the negative electrodes 10 whereby positive intercell connections are obtained by means of the conductive masses 20, which connections are rugged and durable.

In Fig. 7 is illustrated an embodiment of the battery of the invention which is similar to the embodiment of Figs. 1 to 6 with the difference that the bibulous separators between the negative electrodes 10 and the mix slabs 21 are in the form of open-top cups 11a which have their bottoms in contact with the negative electrodes and which have their rims enclosing the lateral surfaces of the mix slabs. The cups 11a are sufficiently large that the mix slabs are free to spread laterally and substantially fill the cell compartments under the influence of the longitudinal compression upon the stack. Another difference is that the adhesive rings 17 and 18 are omitted and the plastic conductive masses 20a are larger than in the embodiment of Figs. 1 to 6 whereby they are certain to completely fill the apertures 15a in the impervious sheets 14a and make sealing contact with the material of the sheets 14a surrounding said apertures, whereby leakage of electrolyte from one cell to another is prevented. Except for the differences which have been described, the battery of Fig. 7 is similar to that of Figs. 1 to 6, and corresponding parts are designated by the same numerals with the addition of the suffix "a," and a separate description will not be given. The cup-shaped separator 11a may be substituted in the battery in which the rings 17 and 18 are present, that is, in the battery which is otherwise similar to that shown in Figs. 1 to 6, and the folded separator 11 may be substituted in the battery in which the rings 17 and 18 are absent, that is, the battery which is otherwise similar to that shown in Fig. 7.

While only two embodiments of the invention have been described, the invention is not limited thereto and changes and modifications may be made within the spirit of the invention as will occur to those skilled in the art.

Invention is claimed as follows:

1. A flat cell battery made up of a plurality of flat cell elements in juxtaposed laminar relation, comprising a plurality of electrode units and depolarizer mix slabs stacked in alternating succession, each said electrode unit comprising the following: a flexible, impervious, thermoplastic, dielectric sheet having an aperture therein, positive and negative electrodes adjacent to the opposite broad surfaces of said sheet respectively and overlying said aperture, said sheet being of greater area than said electrodes whereby a peripheral margin of said sheet extends beyond the edges of said electrodes, a ring of electrolyte-resistant adhesive on each side of said sheet and surrounding said aperture and attaching said sheet to said electrodes respectively, a bibulous sheet covering the front surface of said negative electrode remote from said impervious sheet and folded around the edges and upon and attached to the marginal portions of the back surface of said negative electrode and leaving the mid-portion of said back surface uncovered, an adhesive-plastic conductive mass within said aperture and electrically connecting said electrodes together; the positive electrode of one electrode unit and the negative electrode of the adjacent electrode unit cooperating with the intervening mix slab to form a cell of said stack, a dielectric casing having a thermoplastic interior surface enclosing said stack, the peripheral margins of the impervious sheets of adjacent electrode units being in overlapping relation and heat-welded together to form individual sealing enclosures for each of said cells, and the thermoplastic interior of said casing being heat-welded to said peripheral margins to reinforce said cell enclosures.

2. A flat cell battery made up of a plurality of flat cell elements in juxtaposed laminar relation, comprising a plurality of electrode units and depolarizer mix slabs stacked in alternating succession, each said electrode unit comprising the following: a flexible, impervious, thermoplastic, dielectric sheet having an aperture therein, positive and negative electrodes adjacent to the opposite broad surfaces of said sheet respectively and overlying said aperture, said sheet being of greater area than said electrodes whereby a peripheral margin of said sheet extends beyond the edges of said electrodes, a ring of electrolyte-resistance adhesive on each side of said sheet and surrounding said aperture and attaching said sheet to said electrodes respectively, a bibulous sheet covering the surface of said negative electrode remote from said impervious sheet, a conductor electrically connecting said electrodes through said aperture; the positive electrode of one electrode unit and the negative electrode of the adjacent electrode unit cooperating with the intervening mix slab to form a cell of said stack, a dielectric casing having a thermoplastic interior surface enclosing said stack, the peripheral margins of the impervious sheets of adjacent electrode units being in overlapping relation and heat-welded together to form individual sealing enclosures for each of said cells, and the thermoplastic interior of said casing being heat-welded to said peripheral margins to reinforce said cell enclosures.

3. A flat cell battery made up of a plurality of flat cell elements in juxtaposed laminar relation, comprising a plurality of electrode units and depolarizer mix slabs stacked in alternating succession, each said electrode unit comprising the following: a flexible, impervious, thermoplastic, dielectric sheet having an aperture therein, positive and negative electrodes adjacent to the opposite broad surfaces of said sheet respectively and overlying said aperture, said sheet being of greater area than said electrodes whereby a peripheral margin of said sheet extends beyond the edges of said electrodes, a ring of electrolyte-resistant adhesive on each side of said sheet and surrounding said aperture and attaching said sheet to said electrodes respectively, a conductor electrically connecting said electrodes through said aperture; an open-top bibulous cup enclosing each of said mix slabs leaving the top of said mix slab exposed, the bottom of said cup being in contact with the negative electrode of one electrode unit and the top of said mix slab being in contact with the positive electrode of the adjacent electrode unit to form a cell of said stack, a dielectric casing having a thermoplastic interior surface enclosing said stack, the peripheral margins of the impervious sheets of adjacent electrode units being in overlapping relation and heat-welded together to form individual sealing enclosures for each of said cells, and the thermoplastic interior of said casing being heat-welded to said peripheral margins to reinforce said cell enclosures.

4. A flat cell battery made up of a plurality of flat cell elements in juxtaposed laminar relation, comprising a plurality of electrode units and depolarizer mix slabs